Patented Aug. 25, 1936

2,052,206

UNITED STATES PATENT OFFICE 2,052,206

METHOD OF PRESERVING SUBSTANCES OF ANIMAL ORIGIN

Georg Beisser, deceased, late of Hamburg-Rahlstedt, Germany, by Charlotte Beisser, administratrix, Hamburg-Rahlstedt, Germany No Drawing. Application April 18, 1935, Serial No. 17,150. In Luxemburg April 24, 1934

1 Claim. (Cl. 99—159)

Methods of preserving substances of animal origin, such as meat, fish, poultry or the like in the complete animal carcasses, in organs thereof or in parts of carcasses or organs thereof, by the introduction of the preserving medium into the blood vessels, particularly into the arteries, after the setting-in of the rigor mortis are known. These methods were based upon the experience that only the rigor mortis establishes the necessary conditions for the preserving medium to penetrate from the blood vessels into the individual cells of the tissue which border the blood vessels. As preserving media, pickling liquids were mainly used in these methods, which were introduced under a pressure at which the diffusion from the blood vessels takes place without unnecessarily straining the vessels.

The present invention is based upon the novel and peculiar experience that is not the setting-in of the rigor mortis itself which determines the success of the known method but that the moment from which the method can be carried out with full success occurs after the setting-in of the rigor mortis. A great number of experiments have proved that this moment is reached after the expiration of about seven hours from the death or from the killing of the animal. It is only at and after this moment that the piece of meat absorbs the pickling liquid, irrespective of whether the rigor mortis still remains or whether it is relieved again by autolysis. The experiments have been made at various moments. Thus it has been found that if the pickling liquid is introduced in the piece of meat 20 minutes after the slaughtering, i. e. before the setting-in of the rigor mortis, the whole of the liquid flows out again without remaining in the meat; the piece of meat thus treated (a ham) reduced its weight by about 120 grams during this treatment, which can be explained by the urging-out of the blood contained in the arterial system. Exactly the same happens if the pickling liquid is introduced in the piece of meat at any time within a period of approximately seven to eight hours after the slaughtering. A fundamental change only happens if the pickling liquid is introduced in the circulation after the expiration of this time of seven to eight hours. In this case the same piece of meat absorbed within twelve seconds seven percent of its own weight of the pickling liquid which was under a pressure of slightly above one atmosphere; only about 120 grams of the salt solution was lost through the opened blood vessels. The absorptive power of the piece of meat for the absorbed liquid rose to an optimum value, the later the introduction of the preserving medium took place after the expiration of the seven to eight hours from the death of the animal, whilst after this optimum value the absorptive power slightly decreased again. A perfectly satisfactory absorption of liquid, however, still took place after the pieces of meat had been kept in a cooling chamber for two days in the usual manner.

Apparently, therefore, about seven to eight hours after the death of the animal, certain changes take place in the meat which have not yet been closely examined and which have the effect that the preserving medium is absorbed by the individual cells in quantities sufficient for the preservation, whilst before the moment in consideration the individual cells have no absorptive power for the preserving substance.

What is claimed:

A method of preserving substances of animal origin, such as meat, fish, poultry or the like in complete carcasses, organs thereof or parts of such carcasses or organs, by the introduction of the preserving medium, preferably pickling liquid, in the blood vessels, particularly in the arterial blood vessels, of the piece of meat under treatment after the setting-in of the rigor mortis, said method being characterized by the fact that the introduction of the preserving medium does not take place until after the expiration of seven to eight hours from the death (slaughtering) of the animal.

CHARLOTTE BEISSER,
*Administratrix of Georg Beisser, Deceased.*